(12) United States Patent
Kumar et al.

(10) Patent No.: US 8,857,797 B2
(45) Date of Patent: Oct. 14, 2014

(54) CARBONATION APPARATUS AND METHOD FOR FORMING A CARBONATED BEVERAGE

(75) Inventors: Santhosh Kumar, Naperville, IL (US); Ted Jablonski, Palatine, IL (US); Jayateertha Malagi, Karnataka (IN); Servesh Adderi Ranganath, Karnataka (IN); Nishant Kulkarni, Karnataka (IN); Ravi Malavat, Karnataka (IN)

(73) Assignee: Cornelius, Inc., St. Paul, MN (US)

( * ) Notice: Subject to any disclaimer, the term of this patent is extended or adjusted under 35 U.S.C. 154(b) by 644 days.

(21) Appl. No.: 13/171,957

(22) Filed: Jun. 29, 2011

(65) Prior Publication Data

US 2011/0316175 A1  Dec. 29, 2011

Related U.S. Application Data

(60) Provisional application No. 61/398,631, filed on Jun. 29, 2010.

(51) Int. Cl.
*B01F 3/04* (2006.01)
*A23L 2/54* (2006.01)

(52) U.S. Cl.
CPC ......... *B01F 3/04815* (2013.01); *B01F 3/04737* (2013.01); *B01F 3/04808* (2013.01); *A23L 2/54* (2013.01); *Y10S 261/07* (2013.01)
USPC ................ 261/26; 261/30; 261/76; 261/78.2; 261/DIG. 7; 99/323.1; 426/477

(58) Field of Classification Search
CPC .... B01F 3/04; B01F 3/04021; B01F 3/04049; B01F 3/04056; B01F 3/04787; B01F 3/04815; B01F 3/04808; A23L 2/54

USPC ......... 261/26, 30, 76, 78.2, DIG. 7; 99/323.1; 426/477
See application file for complete search history.

(56) References Cited

U.S. PATENT DOCUMENTS 3,780,198 A  * 12/1973  Pahl et al. ..................... 426/477
4,386,636 A     6/1983  Ellert (Continued)

FOREIGN PATENT DOCUMENTS

DE         10250707      5/2004
DE       202006002983    6/2006

(Continued)

OTHER PUBLICATIONS

International Search Report from corresponding PCT/US2011/042374 issued Feb. 24, 2012; 4 pgs.

(Continued)

*Primary Examiner* — Robert A Hopkins
(74) *Attorney, Agent, or Firm* — Andrus Intellectual Property Law, LLP

(57) ABSTRACT

An inline carbonation apparatus that includes a fluid tube having an inner diameter. At least one water orifice is linked to a water source and is attached to one end of the fluid tube. The water orifice includes a plurality of holes atomizing water that passes therethrough. A carbon dioxide orifice is linked to a carbon dioxide source and is attached to the fluid tube in a spaced relationship from the water orifice. The atomized water has a pressure less than the carbon dioxide such that carbon dioxide is absorbed into the water forming carbonated water having a specified volume of carbonation.

47 Claims, 4 Drawing Sheets

(56) References Cited

U.S. PATENT DOCUMENTS

| | | |
|---|---|---|
| 5,124,088 A | 6/1992 | Stumphauzer |
| 5,510,060 A | 4/1996 | Knoll |
| 5,842,600 A | 12/1998 | Singleterry et al. |
| 6,758,462 B2 * | 7/2004 | Bellas et al. .................. 261/78.2 |
| 2006/0249536 A1 | 11/2006 | Hartman et al. |
| 2006/0288874 A1 | 12/2006 | Ziesel |

FOREIGN PATENT DOCUMENTS

| | | |
|---|---|---|
| DE | 202007003204 | 8/2007 |
| DE | 102008032369 | 1/2010 |
| EP | 1295844 | 3/2003 |
| EP | 2070586 | 6/2009 |
| FR | 2715581 | 8/1995 |
| GB | 1274363 | 5/1972 |
| GB | 2342594 | 4/2000 |
| WO | 00-07707 A1 | 2/2000 |
| WO | 0181238 | 11/2001 |

OTHER PUBLICATIONS

International Search Report and Written Opinion for PCT/US2012044332 dated Sep. 18, 2012.

International Search Report and Written Opinion for PCT/US2012/044300 dated Sep. 18, 2012.

* cited by examiner

CARBONATION APPARATUS AND METHOD FOR FORMING A CARBONATED BEVERAGE

CROSS-REFERENCE TO RELATED APPLICATIONS

This application claims priority of U.S. Provisional Application No. 61/398,631 filed Jun. 29, 2010 which is incorporated herein by reference.

FIELD OF THE INVENTION

The invention relates to carbonation apparatus and a method for forming a carbonated beverage.

BACKGROUND OF THE INVENTION

Generally it is known to provide carbonated beverages that utilize carbonated water. The carbonated water is generally formed using a carbonator tank into which water under pressure is introduced into the tank with carbon dioxide also under pressure. The pressure of the contents of the vessel forces the carbon dioxide into the water forming a carbonated water. Typically such carbonator tanks are bulky and large and increase the manufacturing cost of a beverage dispensing system. Additionally, a large carbonation tank significantly increases the footprint or size of a drink dispenser. Further, large carbonation tanks may provide a failure mode for a carbonated beverage system requiring an expensive replacement of the component.

There is therefore a need in the art for an improved carbonation system and method that provides a carbonated beverage without the use of a large carbonator tank.

SUMMARY OF THE INVENTION

In one aspect, there is disclosed an inline carbonation apparatus that includes a fluid tube having an inner diameter. At least one water orifice is linked to a water source and is attached to one end of the fluid tube. The water orifice includes a plurality of holes atomizing water that passes therethrough. A carbon dioxide orifice is linked to a carbon dioxide source and is attached to the fluid tube in a spaced relationship from the water orifice. The atomized water has a pressure less than the carbon dioxide such that carbon dioxide is absorbed into the water forming carbonated water having a specified volume of carbonation.

In another aspect, an inline carbonation apparatus includes a fluid tube having an inner diameter. At least one water orifice is linked to a water source and is attached at one end of the fluid tube. The water orifice includes a plurality of holes atomizing water passing therethrough. A carbon dioxide orifice is linked to a carbon dioxide source and is attached to the fluid tube in a spaced relationship from the water orifice. The fluid tube includes a first free jet zone defined by a spacing between the water orifice and the carbon dioxide orifice of from one quarter to three quarters of the diameter of the fluid tube. A second mixing zone is defined by the carbon dioxide inlet and a spacing of from one to six times the inner diameter of the fluid tube. The atomized water has a pressure less than the carbon dioxide such that carbon dioxide is absorbed into the water forming carbonated water having a specified volume of carbonation. A third zone or pipe flow zone is defined by the end of the mixing zone and transports the carbonated water.

In a further aspect, there is disclosed a beverage dispensing apparatus that includes a fluid tube having an inner diameter. At least one water orifice is linked to a water source and is attached at one end of the fluid tube. The water orifice includes a plurality of holes that atomize water passing therethrough. A carbon dioxide orifice is linked to a carbon dioxide source and is attached to the fluid tube in a spaced relationship from the water orifice. The atomized water has a pressure less than the carbon dioxide such that carbon dioxide is absorbed into the water forming carbonated water having a specified volume of carbonation. Flow controls are linked to another end of the fluid tube and control or regulate an amount of carbonated water dispensed in a beverage dispenser.

In another aspect, there is disclosed a method of forming a carbonated beverage that includes the steps of providing a water supply and carbon dioxide supply that is linked to an inline carbonation apparatus. The inline carbonation apparatus includes a fluid tube having an inner diameter and at least one water orifice linked to a water source and attached at one end of the fluid tube. The water orifice includes a plurality of holes that atomize water passing therethrough. The carbon dioxide orifice is linked to a carbon dioxide source and is attached to the fluid tube in a spaced relationship from the water orifice. In a next step water and carbon dioxide are introduced into the inline carbonation apparatus at a specified pressure forming carbonated water having a specified volume of carbonation.

DETAILED DESCRIPTION OF THE PREFERRED EMBODIMENTS

Figure 1:
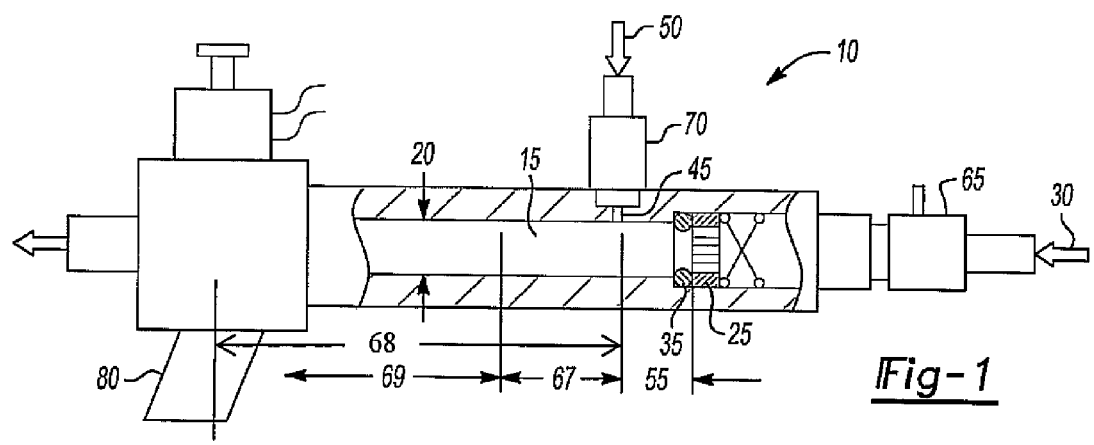
FIG. 1 is a schematic side view of an inline carbonation apparatus.

Referring to FIG. 1, there is shown an inline carbonation apparatus 10 that includes a fluid tube 15 having an inner diameter 20. At least one water orifice 25 is linked to a water source 30 and is attached at one end 35 of the fluid tube 15. The water orifice 25 may have a plurality of holes 40 that atomize water passing therethrough. A carbon dioxide orifice 45 is linked to a carbon dioxide source 50 and is attached to the fluid tube 15 in a spaced relationship from the water orifice 25. The atomized water exiting the water orifice 25 has a pressure that is less than the carbon dioxide such that carbon dioxide is absorbed into the water forming carbonated water having a specified volume of carbonation.

In one aspect, the carbon dioxide orifice 45 is spaced from the water orifice 25 a distance of from one quarter to three quarters of the diameter 20 of the fluid tube 15. This spacing defines a first free jet zone 55 within the inline carbonation apparatus 10. In one aspect, the plurality of holes 40 of the water orifice 25 may have a size ranging from 0.6 to 2.0 millimeters. Various numbers of holes 40 may be formed in the water orifice 25 to create the atomized jet of water.

The carbon dioxide orifice 45 also includes a plurality of holes 60 and may have a size ranging from 1 to 3 millimeters. Either of the water orifice 25 or the carbon dioxide orifice 45 may include a removable orifice plate such that various sized holes as well as various numbers of holes may be utilized in the water orifice 25 or carbon dioxide orifice 45. Alternatively, the water orifice 25 and carbon dioxide orifice 45 may have a fixed number of holes and have a fixed size. A second mixing zone 67 is defined by the carbon dioxide orifice 45 and extends a distance of from 1 to 6 times the inner diameter 20 of the fluid tube 15. The carbon dioxide is introduced into the atomized water in the mixing zone 67. A third pipe flow zone 69 starts at the end of the mixing zone 67 and transports the formed carbonated water through the carbonation apparatus 10.

As stated above, the atomized water exiting the water orifice 25 has a pressure less than the carbon dioxide such that carbon dioxide is absorbed into the water forming the carbonated water. In one aspect, a pressure difference between the atomized water and carbon dioxide is maintained from 5 to 20 psi forming carbonated water having from 2 to 3 volumes of carbonation. In another aspect, a pressure difference between the atomized water and carbon dioxide may be maintained from 30 to 40 psi forming carbonated water having from 3 to 4.5 volumes of carbonation.

As stated above, various volumes of carbonation may be specified by regulating the pressure drop of the water relative to the carbon dioxide. Additionally, water may be introduced into the water orifice 25 that has a pressure of from 80 to 150 psi with a carbon dioxide introduced into the carbon dioxide orifice 45 that has a pressure of from 50 to 120 psi. In this manner carbonated water having from 3 to 4.3 volumes of carbonation may be formed. In another aspect, water may be introduced into the water orifice 25 having a pressure of from 40 to 80 psi with a carbon dioxide introduced into the carbon dioxide orifice 45 having a pressure of from 20 to 60 psi. In this manner carbonated water having from 2 to 3 volumes of carbonation may be formed. Regulating the pressure of the incoming water and carbon dioxide and controlling a pressure drop of the water relative to the carbon dioxide allows for formation of various volume fractions of carbonated water. This allows the formation of beverages that have differing carbonation levels.

The inline carbonation apparatus 10 may include a water check valve 65 that is connected to the water supply 30 and to the water orifice 25 to prevent back flow of carbonated water into the water supply 30. Additionally, a carbon dioxide check valve 70 may be connected to the carbon dioxide supply 50 and to the carbon dioxide orifice 45. In one aspect, the carbon dioxide check valve may have a cracking pressure of less than 5 psi.

Figure 2:
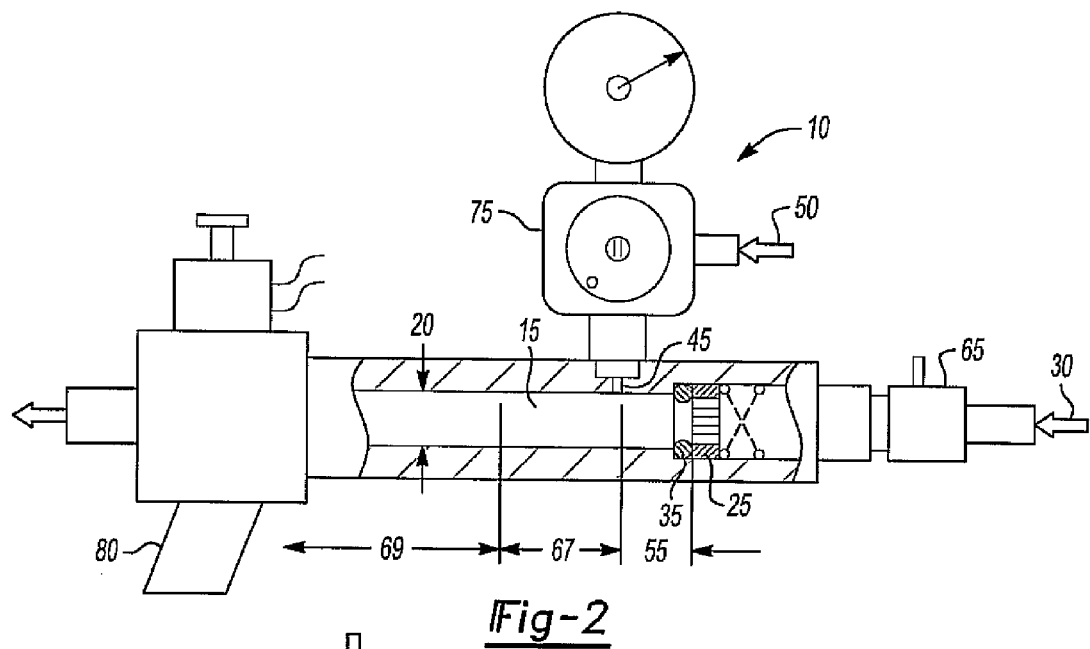
FIG. 2 is a side view schematic representation of an inline carbonation apparatus including a carbon dioxide pressure regulator.

Referring to FIG. 2, there is shown an embodiment of an inline carbonation apparatus 10 that includes a carbon dioxide regulator 75 directly mounted on the fluid tube 15. It should be realized that the carbon dioxide pressure may be regulated using various control mechanisms and systems as will be described in more detail below. Additionally, regulators may be positioned in alternate locations between the carbon dioxide orifice 45 and the source of carbon dioxide 50. In another aspect, the carbon dioxide regulator 75 may be integral with the carbon dioxide valve 70 or may be separate.

In another aspect, the inline carbonation apparatus 10 may include a solenoid valve 80 that is attached to the fluid tube 15. The solenoid valve 80 may prevent dispensing of a non carbonated water and links the fluid tube 15 to various dispensing valves 85. In one aspect, the solenoid valve may is attached to the fluid tube 15 and is positioned a distance 68 of from 4 to 12 times the diameter of the fluid tube 15 from the carbon dioxide orifice 50.

Figure 3:
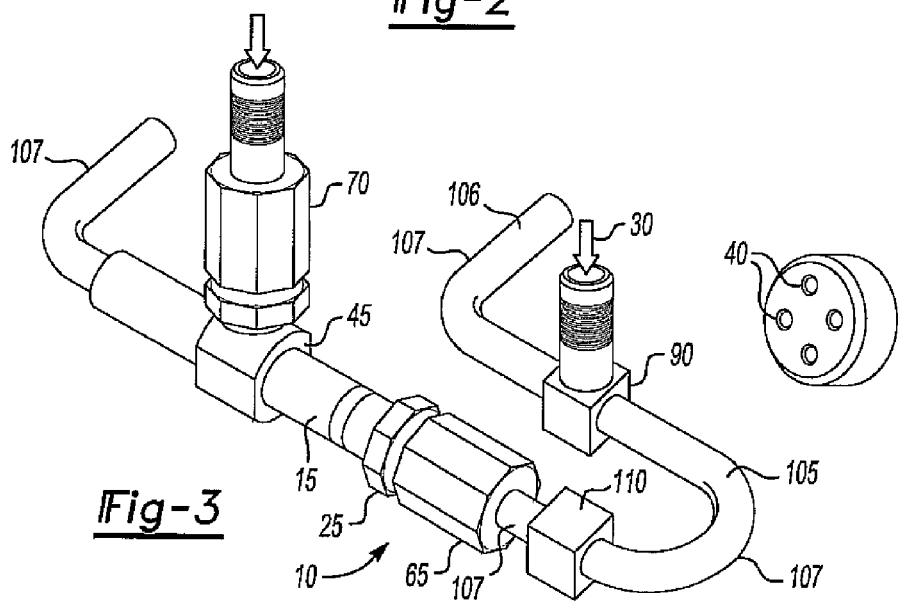
FIG. 3 is a partial perspective view of an inline carbonation apparatus including various attachment couplings and features.

The inline carbonation apparatus 10 may also include a splitting manifold 90 best seen in FIG. 3. The splitting manifold 90 may be connected to the water supply 30 and to the water check valve 65 to separate a non carbonated water source for dispensing. As can be seen in the figure, one leg or tube 100 from the splitting manifold 90 provides a non carbonated source of water while the other tube or connection 105 is linked to the inline carbonator apparatus 10. As can be seen in FIG. 3, multiple connections or tubes 107 may be included with the inline carbonation apparatus 10. In one aspect, various fittings and connections may be utilized. For example, quick disconnect features may be utilized for the check valves of the water orifice 25 and carbon dioxide orifice 45. Additionally, quick disconnect features for the water and tubing connections may also be included. Molded in barb features that connect to water and carbon dioxide tubing connections may also be utilized. Further, integrated solenoid valve mounting features may be included in inline carbonation apparatus 10. Such features and attachments allow the inline carbonation apparatus 10 to be easily assembled and disassembled allowing for quick repair and replacement.

In the embodiment depicted in FIG. 3, water is introduced into the splitting manifold 90 with one tube 100 providing a non carbonated water supply while the second tube 100 exits the splitting manifold 90 and connects with a pressure reducing or regulating valve 110. The pressure regulating valve 110 is coupled to a third tube 107 that is connected to a water check valve 65 having a cracking pressure of less than 5 psi. The water check valve 65 is coupled to a water orifice 25 that is connected to the fluid tube 15. A carbon dioxide check valve 70 is connected to the carbon dioxide orifice 45 that is linked with the fluid tube 15. The fluid tube 15 is further coupled to another tube section 107 that leads to a flow control or dispensing mechanism 85 for dispensing a carbonated beverage.

Figure 4:
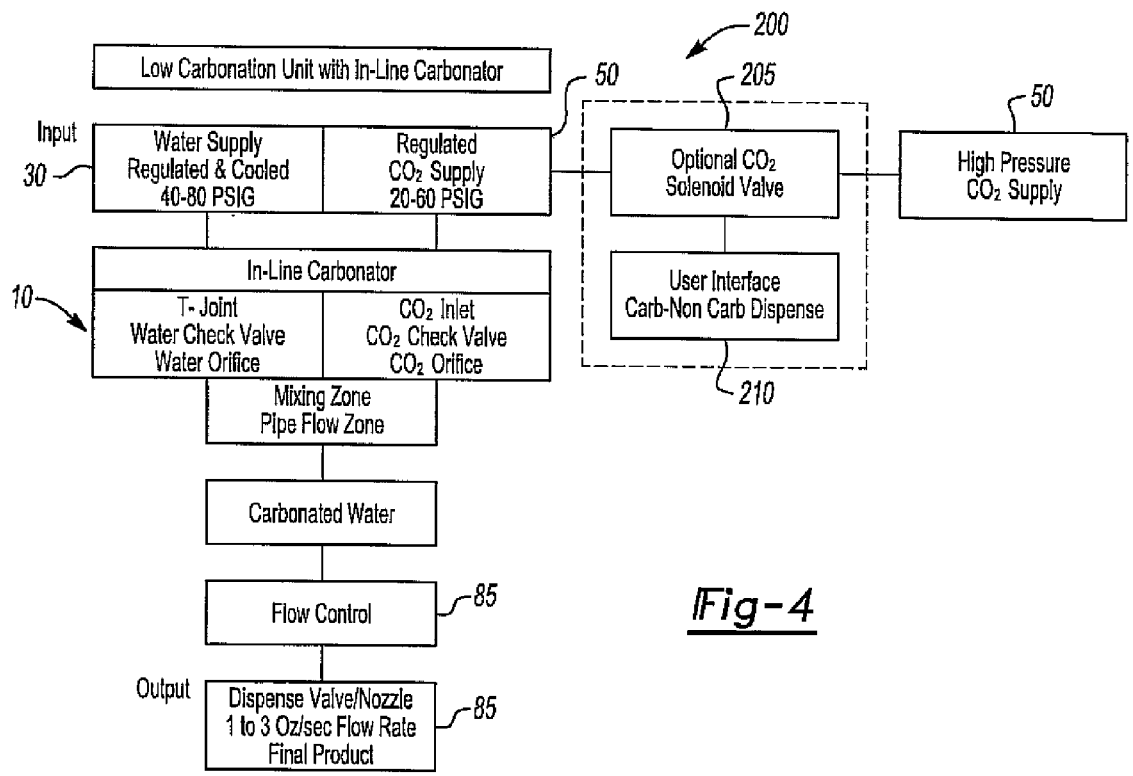
FIG. 4 is a block diagram of a beverage dispensing system that includes the inline carbonator and a $CO_2$ solenoid valve.
Figure 5:
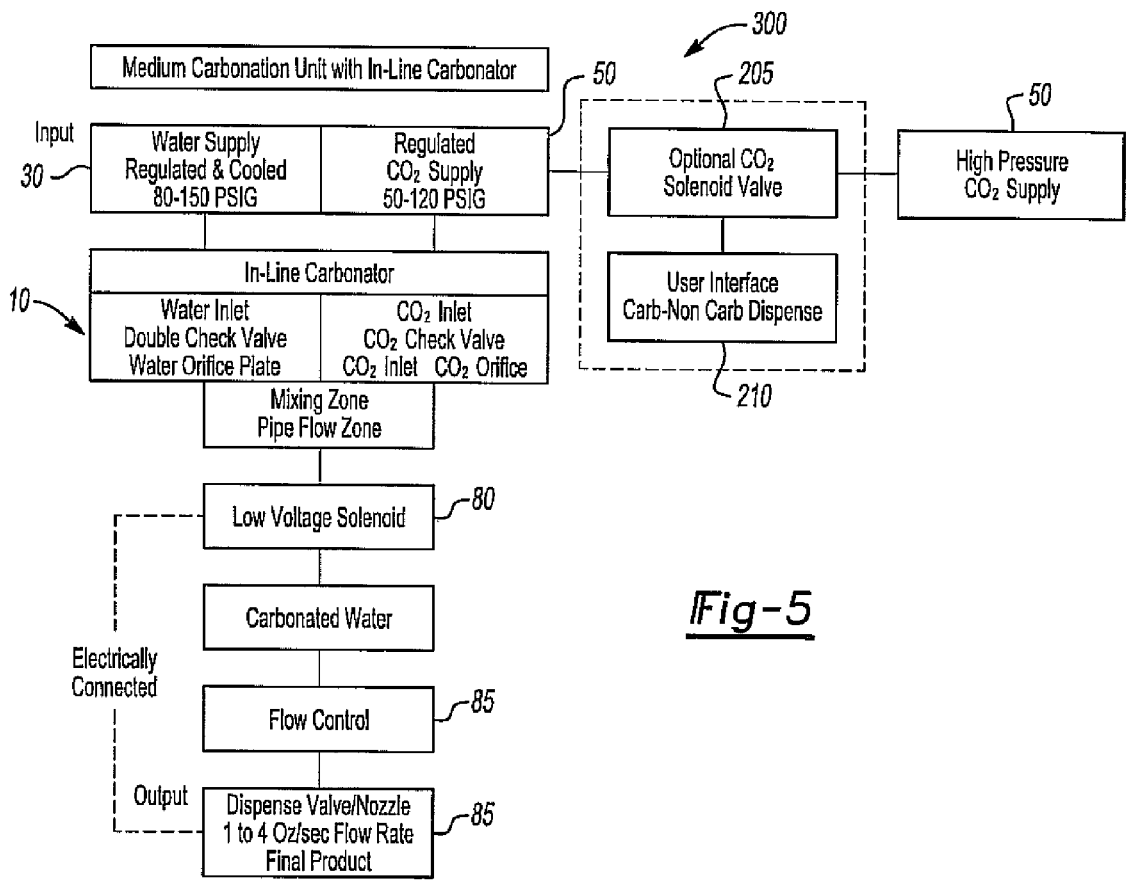
FIG. 5 is a block diagram of a beverage dispensing system including an inline carbonator having a $CO_2$ solenoid valve and a low voltage solenoid valve controlling dispensing of a carbonated beverage.

Referring to FIGS. 4 and 5, there are shown block diagrams for a beverage dispensing apparatus 200 that includes the inline carbonation apparatus 10. As shown in FIG. 4, a water supply 30 and carbon dioxide supply 50 are connected to the inline carbonation apparatus 10. A carbon dioxide valve 205 is connected to the carbon dioxide supply 50 and may be utilized to switch between carbonated and non carbonated water dispensed at the option of a user interface 210. The inline carbonation apparatus 10 produces a carbonated water which is sent to a flow control section 85 to dispense carbonated water at a specified flow rate to form a final dispensed beverage product. The flow control section 85 may include multiple valves or a single valve linked with a single inline carbonator 10 or multiple inline carbonators 10.

Referring to FIG. 5, there is shown a beverage dispensing apparatus 300 that includes the inline carbonation apparatus that is connected to a water supply 30 and a carbon dioxide supply 50. As with the previously described FIG. 4, a carbon dioxide valve 205 may be linked with a user interface 210 to supply both carbonated and non carbonated water for a beverage dispensing system. Additionally, a low voltage solenoid 80 may be included as part of a flow control system to regulate and dispense carbonated water to a dispensing valve or nozzle 85 to produce a final carbonated beverage product.

Figure 6:
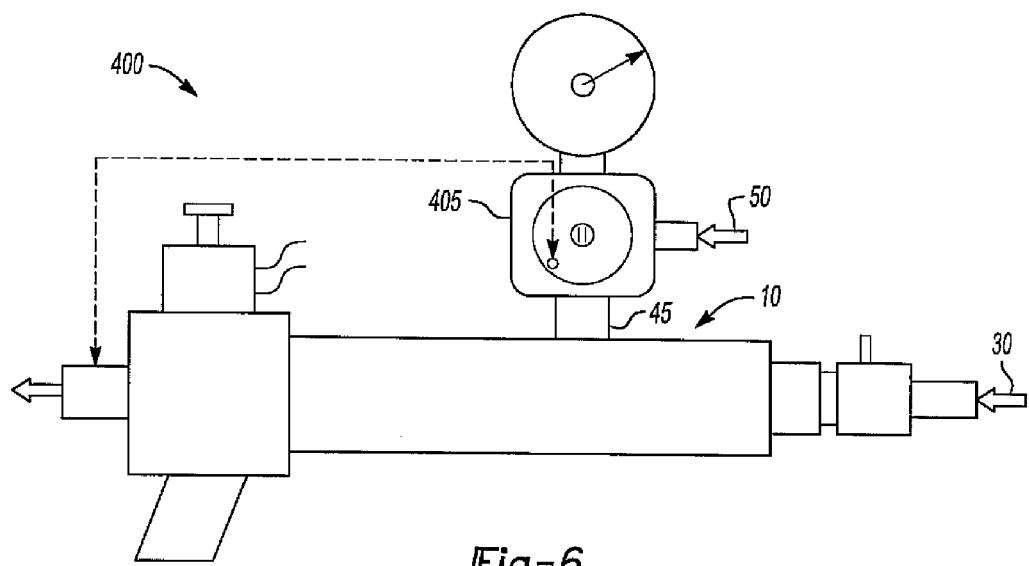
FIG. 6 is a side schematic view of an inline carbonation apparatus having a feedback control mechanism that dynamically adjusts $CO_2$ pressure.

Various feedback and control mechanisms may be utilized to control the carbon dioxide and water pressures introduced into the inline carbonation apparatus 10. Referring to FIG. 6, there is shown a feedback control mechanism 400 that may be utilized to dynamically adjust a carbon dioxide pressure to compensate for water pressure variations. As shown in the figure, a pressure signal of the carbonated water exiting the inline carbonator 10 is fed back into a differential pressure regulator 405 coupled to the carbon dioxide orifice 45. The differential pressure regulator 405 adjusts the diaphragm inside the regulator to dynamically change the water pressure on the other side of the diaphragm to maintain a constant carbon dioxide to water pressure differential.

Figure 7:
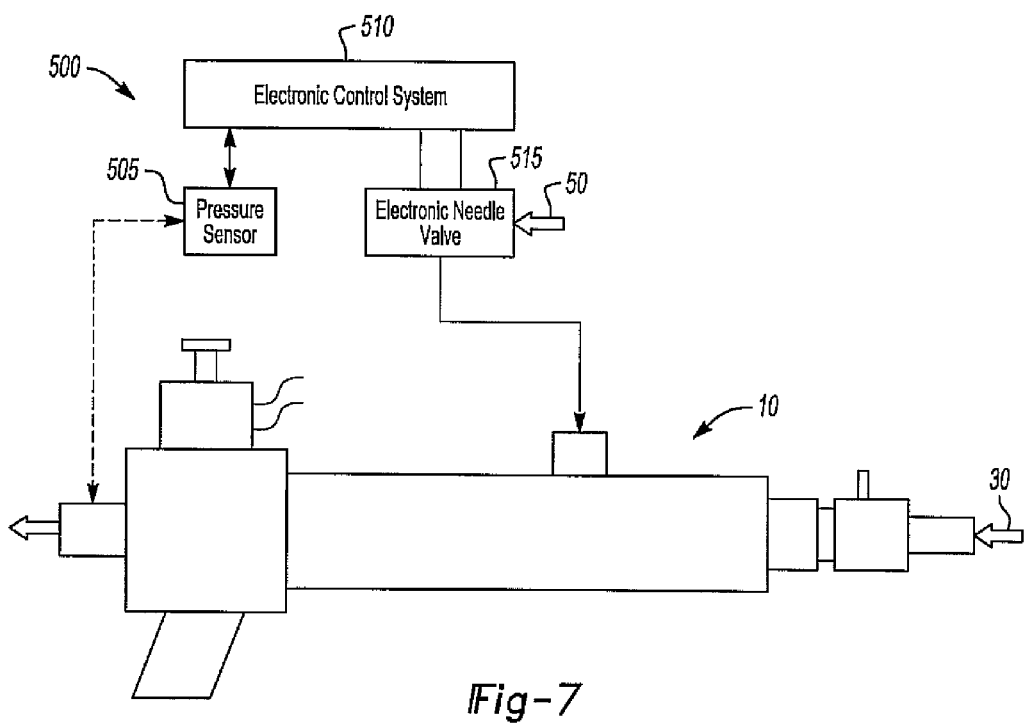
FIG. 7 is a side schematic view of an inline carbonation apparatus including an alternate feedback control system that includes a pressure sensor and logic that controls an electronic needle valve of the carbon dioxide.

Referring to FIG. 7, there is shown an alternate feedback and control mechanism 500 that utilizes a pressure sensor 505 and a control logic system 510 that is coupled to an electronic needle valve 515. The pressure of the carbonated water exiting the inline carbonator 10 is sensed and is continuously fed back into the control or electronic control system 510. The electronic control system 510 automatically adjusts the needle valve 515 to maintain a pressure differential between the atomised water and carbon dioxide introduced into the inline carbonator 10.

Figure 8:
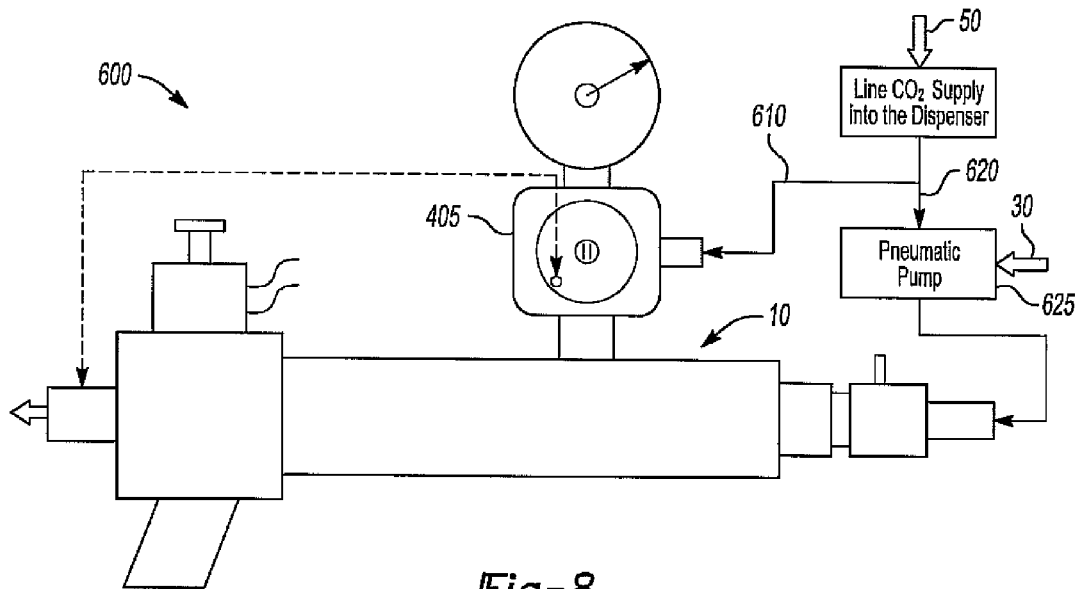
FIG. 8 is a side schematic view of an inline carbonation apparatus including a feedback control mechanism including a differential pressure mechanism that controls a pneumatic pump supplying water to the system.

Referring to FIG. 8, there is shown another feedback control mechanism 600 that may be utilized to dynamically adjust water pressure to accommodate carbon dioxide pressure variations. As can be seen in the figure, the feedback control mechanism 600 includes a differential pressure mechanism 405 that was previously described in FIG. 6. The incoming carbon dioxide is split into two branches 610, 620. One branch 610 feeds the differential pressure regulating mechanism 405 while the other branch 620 is utilized to drive a pneumatic pump 625 which in turn feeds water into the inline carbonator 10. A pressure variation in the incoming carbon dioxide will equally affect both the differential pressure regulating mechanism 405 and the pneumatic pump 625 pressure. Therefore when the pressure drops the pump 625 will have a lower incoming carbon dioxide pressure which will affect the water pressure. The lower water pressure coming into the inline carbonator 10 is sensed by the differential pressure regulating mechanism 405 and adjusts the carbon dioxide pressure into the carbon dioxide orifice 45.

Figure 9:
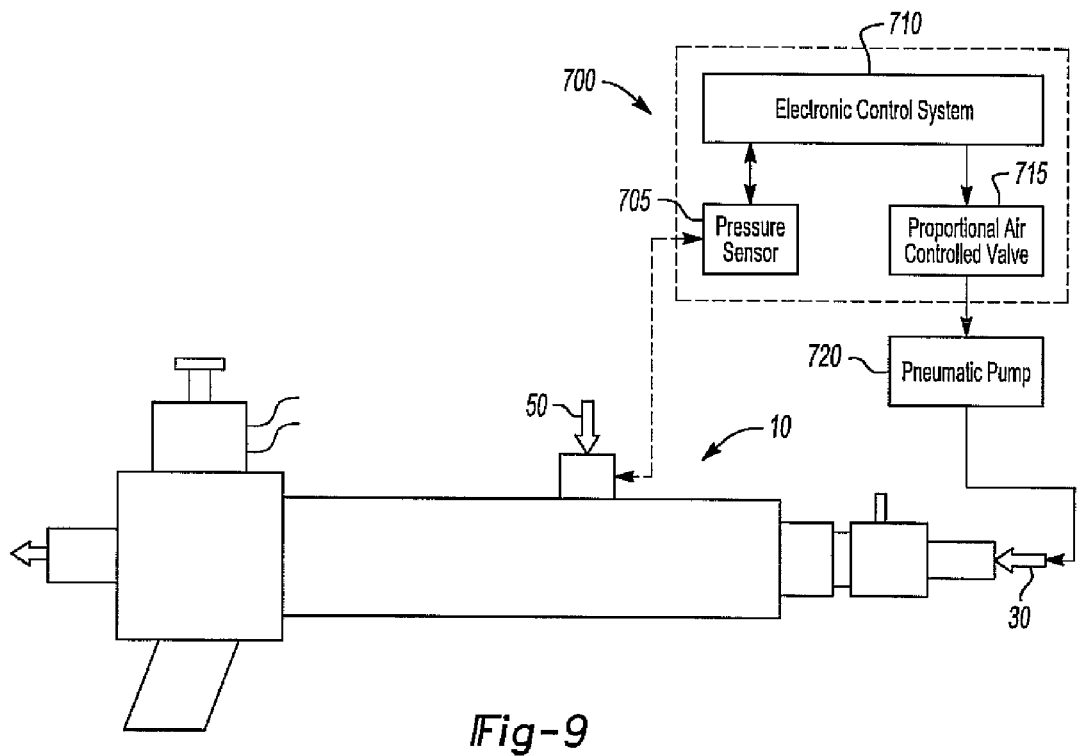
FIG. 9 is a side schematic view of an inline carbonation apparatus including a feedback control mechanism having a proportional air control valve that controls a pneumatic pump supplying water to the apparatus.

Referring to FIG. 9, there is shown another feedback and control mechanism. In the depicted embodiment, the control system 700 includes a pressure sensor 705 and control logic system 710 in conjunction with a proportional air control valve 715. The pressure of the carbon dioxide at the inline carbonator 10 is sensed continuously and is fed back into the electronic control system 710. The carbon dioxide pressure and control logic based in the electronic control system 710 adjusts a proportional air control valve 715 that dynamically adjusts the carbon dioxide pressure entering a pneumatic water pump 720. In this manner a constant carbon dioxide to water pressure differential as described above may be maintained.

A method of forming a carbonated beverage is also provided. The method includes the steps of providing a water supply 30 and carbon dioxide supply 50 that is linked to an inline carbonation apparatus 10. The inline carbonation apparatus 10 includes a fluid tube 15 having an inner diameter 20. At least one water orifice 25 is linked to the water source 30 and is attached at one end of the fluid tube 15. The water orifice 25 has a plurality of holes 40 atomizing water passing therethrough. A carbon dioxide orifice 45 is linked to a carbon dioxide source 50 and is attached to the fluid tube 15 in a spaced relationship from the water orifice 25. The method includes introducing water and carbon dioxide into the inline carbonation apparatus 10 at a specified pressure forming carbonated water having a specified volume of carbonation.

In one aspect, the method includes atomizing water such that it has a pressure less than carbon dioxide introduced through the carbon dioxide orifice 45 such that carbon dioxide is absorbed into the water forming carbonated water having a specified volume of carbonation. In one aspect, the method includes spacing the water orifice 25 from the carbon dioxide orifice 45 a distance of from one quarter to three quarters of the diameter 20 of the fluid tube 15. Additionally, the method may include providing water and carbon dioxide at various pressures to form specific volume fractions of carbonation within a carbonated water. In one aspect, a pressure difference between the atomized water and carbon dioxide may be from 5 to 20 psi forming carbonated water having from 2 to 3 volumes of carbonation. Alternatively, a pressure difference between the atomized water and carbon dioxide may be maintained from 30 to 40 psi forming carbonated water having from 3 to 4.5 volumes of carbonation.

The method as stated above may also include supplying water and carbon dioxide at various pressures. In one aspect, the water orifice may have a pressure of from 80 to 150 psi and the carbon dioxide introduced into the carbon dioxide orifice may have a pressure of from 50 to 120 psi. Alternatively, the water orifice may have a pressure of from 40 to 80 psi and the carbon dioxide introduced into the carbon dioxide orifice may have a pressure of from 20 to 60 psi.

The method of the present invention may also include mixing carbonated water formed in the inline carbonation apparatus 10 in a desired ratio with a flavor and dispensing as a carbonated beverage. Various volume fractions of carbonated water may be utilized to form different beverages. Additionally, the method may include the step of bypassing the inline carbonator 10 such that non carbonated water is supplied and dispensed in a non carbonated beverage.

The invention claimed is:

1. An inline carbonation apparatus comprising:
a fluid tube having an inner diameter;
at least one water orifice linked to a water source and attached at one end of the fluid tube, the water orifice having a plurality of holes atomizing water passing therethrough;
a carbon dioxide orifice linked to a carbon dioxide source and attached to the fluid tube in a spaced relationship from the water orifice, wherein the atomized water has a pressure less than the carbon dioxide such that carbon dioxide is absorbed into the water forming carbonated water having a specified volume of carbonation; and
a solenoid valve attached to the fluid tube, the solenoid valve preventing dispensing of non-carbonated water and linking the fluid tube to dispensing valves.

2. The inline carbonation apparatus of claim 1 wherein the carbon dioxide orifice is spaced from the water orifice a distance of from one quarter to three quarters of the diameter of the fluid tube.

3. The inline carbonation apparatus of claim 1 wherein the plurality of holes of the water orifice have a size of from 0.6 to 2.0 millimeters.

4. The inline carbonation apparatus of claim 1 wherein the carbon dioxide orifice includes a plurality of holes having a size of from 1 to 3 millimeters.

5. The inline carbonation apparatus of claim 1 wherein a pressure difference between the atomized water and carbon dioxide is from 5 to 20 psi forming carbonated water having from 2 to 3 volumes of carbonation.

6. The inline carbonation apparatus of claim 1 wherein a pressure difference between the atomized water and carbon dioxide is from 30 to 40 psi forming carbonated water having from 3 to 4.5 volumes of carbonation.

7. The inline carbonation apparatus of claim 1 wherein water introduced into the water orifice has a pressure of from 80 to 150 psi and carbon dioxide introduced into the carbon dioxide orifice has a pressure of from 50 to 120 psi forming carbonated water having from 3 to 4.5 volumes of carbonation.

8. The inline carbonation apparatus of claim 1 wherein water introduced into the water orifice has a pressure of from 40 to 80 psi and carbon dioxide introduced into the carbon dioxide orifice has a pressure of from 20 to 60 psi forming carbonated water having from 2 to 3 volumes of carbonation.

9. The inline carbonation apparatus of claim 1 wherein the water or carbon dioxide orifice includes a removable orifice plate.

10. The inline carbonation apparatus of claim 1 including a water check valve connected to the water supply and to the water orifice preventing back flow of carbonated water into the water supply.

11. The inline carbonation apparatus of claim 1 including a carbon dioxide check valve connected to the carbon dioxide supply and to the carbon dioxide orifice, the carbon dioxide check valve having a cracking pressure of less than 5 psi.

12. The inline carbonation apparatus of claim 11 including a carbon dioxide regulator directly mounted on the fluid tube.

13. The inline carbonation apparatus of claim 1 wherein the solenoid valve is positioned a distance of from 4 to 12 times the diameter of the fluid tube from the carbon dioxide orifice.

14. The inline carbonation apparatus of claim 1 comprising attaching features for rapid attachment and decoupling of the water source and carbon dioxide source to the fluid tube.

15. The inline carbonation apparatus of claim 1 wherein the fluid tube includes a first free jet zone defined by a spacing between the water orifice and the carbon dioxide orifice of from one quarter to three quarters of the diameter of the fluid tube and a second mixing zone defined by the carbon dioxide inlet and a spacing of from one to six times the inner diameter of the fluid tube wherein the atomized water has a pressure less than the carbon dioxide such that carbon dioxide is absorbed into the water forming carbonated water having a specified volume of carbonation and a third pipe flow zone defined by the end of the mixing zone transporting the carbonated water.

16. The inline carbonation apparatus of claim 1 including a control and feedback system linked with the inline carbonation apparatus controlling a pressure of the water and carbon dioxide introduced into the inline carbonation apparatus.

17. An inline carbonation apparatus comprising:
a fluid tube having an inner diameter;
at least one water orifice linked to a water source and attached at one end of the fluid tube, the water orifice having a plurality of holes atomizing water passing therethrough;
a carbon dioxide orifice linked to a carbon dioxide source and attached to the fluid tube in a spaced relationship from the water orifice wherein the atomized water has a pressure less than the carbon dioxide such that carbon dioxide is absorbed into the water forming carbonated water having a specified volume of carbonation; and
a splitting manifold connected to the water supply and to a water check valve separating a non carbonated water source for dispensing.

18. The inline carbonation apparatus of claim 17 wherein the splitting manifold, water check valve and fluid tube are integral components.

19. The inline carbonation apparatus of claim 17 wherein the splitting manifold, water check valve and fluid tube are separate components.

20. An inline carbonation apparatus comprising:
a fluid tube having an inner diameter;
at least one water orifice linked to a water source and attached at one end of the fluid tube the water orifice having a plurality of holes atomizing water passing therethrough;
a carbon dioxide orifice linked to a carbon dioxide source and attached to the fluid tube in a spaced relationship from the water orifice, wherein the atomized water has a pressure less than the carbon dioxide such that carbon dioxide is absorbed into the water forming carbonated water having a specified volume of carbonation; and
a control and feedback system linked with the inline carbonation apparatus controlling a pressure of the water and carbon dioxide introduced into the inline carbonation apparatus;
wherein the control and feedback system includes a pressure signal of the carbonated water exiting the inline carbonator fed back into a differential pressure regulator coupled to the carbon dioxide orifice, the differential pressure regulator adjusting a diaphragm inside the regulator to dynamically change the water pressure on the other side of the diaphragm to maintain a constant carbon dioxide to water pressure differential.

21. An inline carbonation apparatus comprising:
a fluid tube having an inner diameter;
at least one water orifice linked to a water source and attached at one end of the fluid tube, the water orifice having a plurality of holes atomizing water passing therethrough;
a carbon dioxide orifice linked to a carbon dioxide source and attached to the fluid rube in a spaced relationship from the water orifice, wherein the atomized water has a pressure less than the carbon dioxide such that carbon dioxide is absorbed into the water forming carbonated water having a specified volume of carbonation; and
a control and feedback system linked, with the inline carbonation apparatus controlling a pressure of the water and carbon dioxide introduced into the inline carbonation apparatus;
wherein the control and feedback system includes a pressure signal of the carbonated water exiting the inline carbonator fed back into a differential pressure regulator coupled to the carbon dioxide orifice, the incoming carbon dioxide split into two branches wherein one branch feeds the differential pressure regulating mechanism and the other branch driving a pneumatic primp feeding water into the inline carbonator.

22. An inline carbonation apparatus comprising:
a fluid tube having an inner diameter;
at least one water orifice linked to a water source and attached at one end of the fluid tube, the water orifice having a plurality of holes atomizing water passing therethrough;
a carbon dioxide orifice linked to a carbon dioxide source and attached to the fluid tube in a spaced relationship from the water orifice, wherein the atomized water has a pressure less than the carbon dioxide such that carbon dioxide is absorbed into the water forming carbonated water having a specified volume of carbonation; and a control and feedback system linked with the inline carbonation apparatus controlling a pressure of the water and carbon dioxide introduced into the inline carbonation apparatus;

wherein the control and feedback system includes a pressure sensor and a control logic system that is coupled to an electronic needle valve, the pressure of the carbonated water exiting the inline carbonator sensed and continuously fed back into the control or electronic control system automatically adjusting the needle valve to maintain a pressure differential between the atomized water and carbon dioxide introduced into the inline carbonator.

23. An inline carbonation apparatus comprising:
a fluid tube having an inner diameter;
at least one water orifice linked to a water source and attached at one end of the fluid tube the water orifice having a plurality of holes atomizing water passing therethough;
a carbon dioxide orifice linked to a carbon dioxide source and attached to the fluid tube in a spaced relationship from the water orifice, wherein the atomized water has a pressure less than the carbon dioxide such that carbon dioxide is absorbed into the water forming carbonated water having a specified volume of carbonation; and
a control and feedback system linked with the inline carbonation apparatus controlling a pressure of the water and carbon dioxide introduced into the inline carbonation apparatus;
wherein the control and feedback system includes a pressure sensor and control logic system linked with a proportional air control valve, the pressure of the carbon dioxide sensed continuously and fed back into the electronic control system wherein the control logic adjusts a proportional air control valve that dynamically adjusts the carbon dioxide pressure entering a pneumatic water pump.

24. An inline carbonation apparatus comprising:
a fluid tube having an inner diameter;
at least one water orifice linked to a water source and attached at one end of the fluid tube,
a carbon dioxide orifice linked to a carbon dioxide source and attached to the fluid tube in a spaced relationship from the water orifice, wherein the atomized water has a pressure less than the carbon dioxide such that carbon dioxide is absorbed into the water forming carbonated water having a specified volume of carbonation;
a solenoid valve attached to the fluid tube, the solenoid valve preventing dispensing of non carbonated water and linking the fluid tube to dispensing valves wherein the solenoid valve is positioned a distance of from 4 to 12 times the diameter of the fluid tube from the carbon dioxide orifice.

25. A method of forming a carbonated beverage comprising the steps of:
providing a water supply and carbon dioxide supply linked to an inline carbonation apparatus having a fluid tube having an inner diameter, at least one water orifice linked to a water source and attached at one end of the fluid tube, the water orifice having a plurality of holes atomizing water passing therethrough; and a carbon dioxide orifice linked to a carbon dioxide source and attached to the fluid tube in a spaced relationship from the water orifice;
introducing water and carbon dioxide into the inline carbonation apparatus at a specified pressure forming carbonated water having a specified volume of carbonation;
wherein the water orifice atomizes water and has a pressure less than the carbon dioxide such that carbon dioxide is absorbed into the water forming carbonated water having a specified volume of carbonation; and
bypassing the inline carbonator with the water and dispensing a non carbonated beverage.

26. The method of claim 25 wherein a pressure difference between the atomized water and carbon dioxide is from 5 to 20 psi forming carbonated water having from 2 to 3 volumes of carbonation.

27. The method of claim 25 wherein a pressure difference between the atomized water and carbon dioxide is from 30 to 40 psi forming carbonated water having from 3 to 4.5 volumes of carbonation.

28. The method of claim 25 wherein water introduced into the water orifice has a pressure of from 80 to 150 psi and carbon dioxide introduced into the carbon dioxide orifice has a pressure of from 50 to 120 psi forming carbonated water having from 3 to 4.5 volumes of carbonation.

29. The method of claim 25 wherein water introduced into the water orifice has a pressure of from 40 to 80 psi and carbon dioxide introduced into the carbon dioxide orifice has a pressure of from 0.20 to 60 psi forming carbonated water having from 2 to 3 volumes of carbonation.

30. The method of claim 25 wherein the carbon dioxide orifice is spaced from the water orifice a distance of from one quarter to three quarters of the diameter of the fluid tube.

31. The method of claim 25 including mixing the carbonated water in a desired ratio with a flavor and dispensing as a beverage.

32. An inline carbonation apparatus comprising:
a fluid conduit having an upstream end, a downstream end, and an inner diameter;
a water source configured to supply a steam of water to the upstream end;
wherein the fluid conduit has a water orifice through which the stream of water passes, the water orifice defining a plurality of holes that are configured to atomize the stream of water; and
a carbon dioxide source configured to introduce a specified volume of carbon dioxide into the atomized stream of water via a carbon dioxide orifice that is located downstream of the water orifice;
wherein the water orifice is configured to cause the atomized stream of water to have a pressure that is less than a pressure of the carbon dioxide so that the carbon dioxide is adsorbed into the atomized stream of water and thereby produces a carbonated stream of water having a specified volume of carbonation.

33. The apparatus according to claim 32, wherein the carbon dioxide orifice is spaced from the water orifice by a distance of one-quarter to three-quarters of the diameter of the fluid conduit.

34. The apparatus according to claim 32, wherein each hole in the plurality of holes of the water orifice has a size of from 0.6 to 2.0 millimeters.

35. The apparatus according to claim 32, wherein the carbon dioxide orifice comprises a plurality of holes, each hole in the plurality of holes having a size of from 1 to 3 millimeters.

36. The apparatus according to claim 32, wherein a pressure difference between the atomized stream of water and the carbon dioxide is from 5 to 20 psi so that the carbonated stream of water has from 2 to 3 volumes of carbonation.

37. The apparatus according to claim 32, wherein a pressure difference between the atomized stream of water and the carbon dioxide is from 30 to 40 psi so that the carbonated stream of water has from 3 to 4.5 volumes of carbonation.

38. The apparatus according to claim 32, wherein the stream of water provided to the upstream end has a pressure of from 80 to 150 psi and wherein the carbon dioxide introduced through the carbon dioxide orifice has a pressure of from 50 to 120 psi, so that the carbonated stream of water has from 3 to 4.5 volumes of carbonation.

39. The apparatus according to claim 32, wherein the stream of water provided to the upstream end has a pressure of from 40 to 80 psi and wherein the carbon dioxide has a pressure of from 20 to 60 psi, so that the carbonated stream of water has from 2 to 3 volumes of carbonation.

40. The apparatus according to claim 32, wherein at least one of the water orifice and the carbon dioxide orifice comprises a removable orifice plate.

41. The apparatus according to claim 32, comprising a water check valve connected to the water supply and connected to the water orifice, wherein the water check valve prevents back flow of carbonated water into the water supply.

42. The apparatus according to claim 32 comprising a carbon dioxide check valve connected to the carbon dioxide supply and connected to the carbon dioxide orifice, wherein the carbon dioxide check valve has a cracking pressure of less than 5 psi.

43. The apparatus according to claim 42, comprising a carbon dioxide regulator that is mounted on the fluid conduit, the carbon dioxide regulator configured to regulate the specified volume of carbon dioxide.

44. The apparatus according to claim 32, comprising a dispensing valve, and further comprising a solenoid valve attached to the fluid conduit, the solenoid valve preventing dispensing of non-carbonated water and linking the fluid conduit to the dispensing valve.

45. The apparatus according to claim 44, wherein the solenoid valve is positioned a distance of from 4 to 12 times the diameter of the fluid conduit from the carbon dioxide orifice.

46. The apparatus according to claim 32, comprising a splitting manifold that connects the water source to a water check valve that separates a non-carbonated water supply from the water source for dispensing from a dispenser valve.

47. The apparatus according to claim 32, wherein the fluid conduit comprises a first free jet zone defined by a spacing between the water orifice and the carbon dioxide orifice of from one quarter to three quarters of the diameter of the fluid tube, a second mixing zone defined by the carbon dioxide orifice and a spacing of from one to six times the inner diameter of the fluid conduit, wherein the atomized stream of water has a pressure less than the carbon dioxide such that carbon dioxide is absorbed into the stream of water forming the carbonated stream of water having the specified volume of carbonation, and a third pipe flow zone defined by an end of the mixing zone transporting the carbonated stream of water.

* * * * *